US008348625B2

(12) United States Patent
Sato et al.

(10) Patent No.: US 8,348,625 B2
(45) Date of Patent: Jan. 8, 2013

(54) MULTIPLE FAN SPEED CONTROL SYSTEM FOR PREVENTING OVERLOAD AT START-UP

(75) Inventors: Toshiaki Sato, Kusatsu (JP); Hiroshi Doumae, Sakai (JP); Sumio Kagimura, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 474 days.

(21) Appl. No.: 12/595,875

(22) PCT Filed: Apr. 22, 2008

(86) PCT No.: PCT/JP2008/057726
§ 371 (c)(1),
(2), (4) Date: Oct. 14, 2009

(87) PCT Pub. No.: WO2008/133240
PCT Pub. Date: Nov. 6, 2008

(65) Prior Publication Data
US 2010/0114379 A1 May 6, 2010

(30) Foreign Application Priority Data
Apr. 25, 2007 (JP) ................................. 2007-115061

(51) Int. Cl.
*F04B 49/00* (2006.01)
*H02P 5/00* (2006.01)
(52) U.S. Cl. ......... 417/42; 417/44.1; 417/326; 318/255; 318/90
(58) Field of Classification Search ................... 417/5, 6, 417/42, 44.1, 326, 426; 318/255, 256, 257, 318/268, 34, 51, 90; 454/184
See application file for complete search history.

(56) References Cited

U.S. PATENT DOCUMENTS

| 4,651,922 | A | * | 3/1987 | Noba | 236/35 |
| 4,988,930 | A | * | 1/1991 | Oberheide | 318/82 |
| 6,467,695 | B1 | * | 10/2002 | Riley et al. | 236/49.3 |
| 6,809,484 | B2 | * | 10/2004 | Makaran et al. | 318/34 |
| 6,933,687 | B2 | * | 8/2005 | Makaran et al. | 318/34 |
| 7,095,188 | B1 | * | 8/2006 | Lin | 318/400.12 |
| 7,925,390 | B2 | * | 4/2011 | Jingu et al. | 700/301 |
| 2006/0178786 | A1 | * | 8/2006 | Bhagwath et al. | 700/300 |
| 2008/0310967 | A1 | * | 12/2008 | Franz et al. | 417/32 |
| 2011/0053488 | A1 | * | 3/2011 | Gans et al. | 454/343 |

FOREIGN PATENT DOCUMENTS

| JP | 06185791 | A | * | 7/1994 |
| JP | 06-317292 | A | | 11/1994 |
| JP | 07-337080 | A | | 12/1995 |

(Continued)

*Primary Examiner* — Devon Kramer
*Assistant Examiner* — Nathan Zollinger
(74) *Attorney, Agent, or Firm* — Global IP Counselors (57) ABSTRACT

A fan control system includes first and second adjacent fans, first and second motors configured to rotate the first and second fans, and a control unit configured to control rotational speeds of the first and second motors in order to control rotational speeds of the first and second fans. The first and second motors are energized such that the rotational speeds of the first and second fans reach target rotational speeds prior to increasing the rotational speeds of the first and second fans to required rotational speeds. The target rotational speeds are lower than the required rotational speeds. The first and second motors are energized such that the rotational speeds of the first and second fans reach the required rotational speeds after the rotational speeds of the first and second fans reach the target rotational speeds.

6 Claims, 4 Drawing Sheets

FOREIGN PATENT DOCUMENTS

| | | |
|---|---|---|
| JP | 08-303386 A | 11/1996 |
| JP | 11-132187 A | 5/1999 |
| JP | 2000-50681 A | 2/2000 |
| JP | 2000-287496 A | 10/2000 |
| JP | 2005-171843 A | 6/2005 |

\* cited by examiner

MULTIPLE FAN SPEED CONTROL SYSTEM FOR PREVENTING OVERLOAD AT START-UP

CROSS-REFERENCE TO RELATED APPLICATIONS

This U.S. National stage application claims priority under 35 U.S.C. §119(a) to Japanese Patent Application No. 2007-115061, filed in Japan on Apr. 25, 2007, the entire contents of which are hereby incorporated herein by reference.

TECHNICAL FIELD

The present invention relates to a fan control system, and more particularly relates to a fan control system that controls a plurality of fans.

BACKGROUND ART

In recent years, the motors that drive the fans of outdoor units of air conditioners (hereinbelow, abbreviated as outdoor fans) have been controlled by inverters, wherein rotational speed is controlled in accordance with instructions regardless of the external load's size. Because outdoor fans are generally disposed outdoors, natural wind sometimes causes them to rotate in reverse when stopped; when the motor is started up in such a state, an overcurrent is sometimes generated in the inverter circuit, which causes the motor to stop abnormally. One way of solving this problem is a method, which has already been disclosed (e.g., refer to Japanese Patent Application Publication No. H8-303386), that presets a permissible start-up rotational speed at which the fan can be started up even if it is rotating in reverse; with this method, if the fan is rotating in reverse at a speed greater than or equal to that start-up permissible rotational speed, the fan is not started up.

SUMMARY OF THE INVENTION

Technical Problem

Figure 4:
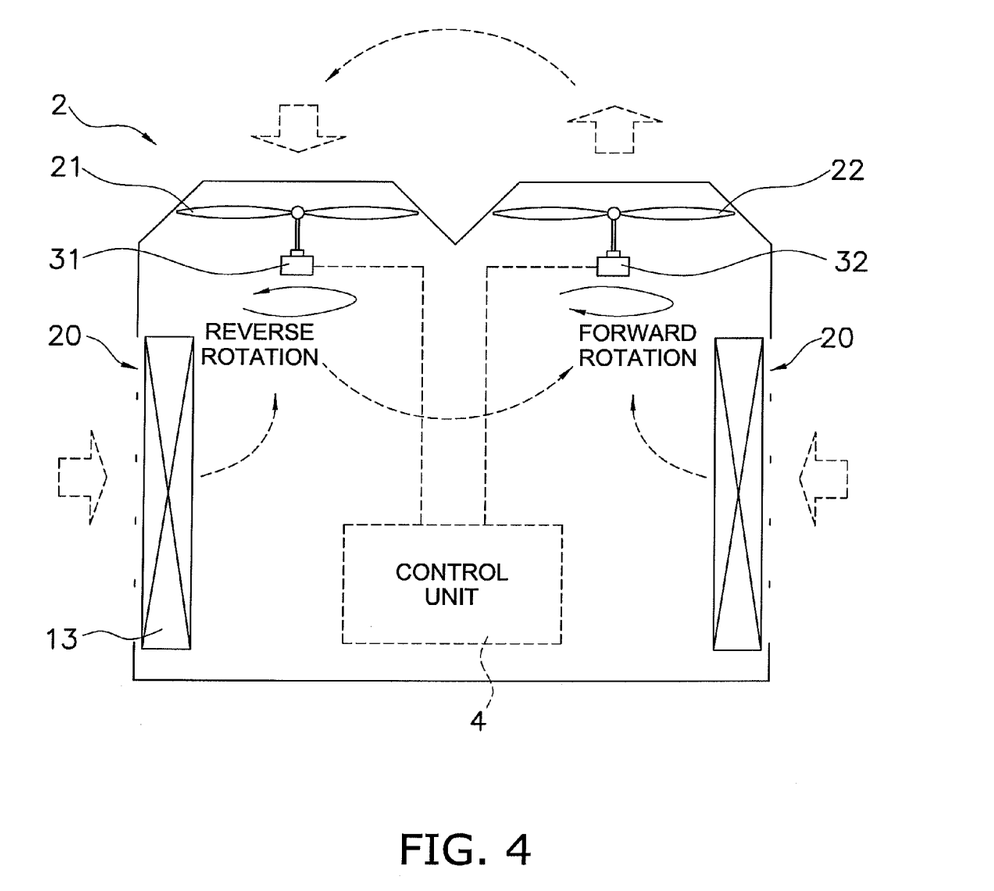
FIG. 4 is a configuration diagram of the air conditioner's outdoor unit.

Nevertheless, in an air conditioner's outdoor unit wherein a plurality of outdoor fans are mounted in the same air passageway as shown in FIG. 4, if, when all of the outdoor fans are started up, one of the fans starts up earlier than the others, then the dynamic pressure on the suction side of the fan that started up early will act on the adjacent fans as a load in the reverse rotational direction. Because, in this case, current will already have started flowing to all of the motors, there is a strong possibility that the load at start-up will increase and overcurrents will be generated in the inverter circuits of the motors that must start up those fans subject to loads in the reverse rotational direction; therefore, the method recited in Patent Document 1, which aims principally to control a single fan, cannot solve the aforementioned problem.

An object of the present invention is to provide a fan control system that, when a plurality of fans is started up and one fan starts to rotate ahead of the others, suppresses an increase in the loads at start-up on these other fans.

Solution to Problem

A fan control system according to a first aspect of the present invention comprises a first fan, a second fan, a first motor, a second motor, and a control unit. The second fan is adjacent to the first fan. The first motor rotates the first fan. The second motor rotates the second fan. The control unit controls the rotational speeds of the first motor and the second motor. The control unit, prior to increasing the rotational speeds of the first fan and the second fan to required rotational speeds, energizes the first motor and the second motor such that the rotational speeds reach target rotational speeds, the values of which are lower than those of the required rotational speeds. Furthermore, the control unit, after the rotational speeds of both the first fan and the second fan reach the target rotational speeds, energizes the first motor and the second motor such that the rotational speeds of the first fan and the second fan reach the required rotational speeds.

In this fan control system, the rotational speeds of the fans are kept low, which reduces the dynamic pressure on the suction side of the fan that started early and suppresses pressure that would otherwise work to rotate adjacent fans in reverse. In addition, even if the adjacent fans were to rotate in reverse, the rotational speeds thereof would be low and the load that is needed to change the rotational direction from reverse rotation to forward rotation at start-up would be small.

A fan control system according to a second aspect of the present invention is a fan control system according to the first aspect of the present invention, wherein the required rotational speed of the first fan and the required rotational speed of the second fan are set to different values.

In this fan control system, when the air resistances on the suction sides of the first fan and the second fan are different, it is possible to provide a difference in their required rotational speeds and thereby to equalize the dynamic pressures on the suction sides of the first fan and the second fan. As a result, the generation of a load owing to a dynamic pressure differential is suppressed.

A fan control system according to a third aspect of the present invention is a fan control system according to the first or second aspect of the present invention, wherein the target rotational speed of the first fan and the target rotational speed of the second fan are set to different values.

In this fan control system, when the air resistances on the suction sides of the first fan and the second fan are different, it is possible to provide a difference in their target rotational speeds and thereby to equalize the dynamic pressures on the suction sides of the first fan and the second fan. As a result, the generation of a load owing to a dynamic pressure differential is suppressed.

A fan control system according to a fourth aspect of the present invention is a fan control system according to any one of the first through third aspects of the present invention, wherein
the target rotational speeds are set in a plurality of steps.

In this fan control system, dividing the target rotational speed into steps makes it possible to reduce the rate of increase when increasing the rotational speed to a higher target rotational speed. As a result, the rate of increase of the dynamic pressure on the suction side of each of the fans decreases and the load applied to the adjacent fan also decreases.

A fan control system according to a fifth aspect of the present invention is a fan control system according to any one of the first through fourth aspects of the present invention, wherein when the rotational speed of the first fan is increased, the rotational speed when the second fan starts to rotate in reverse owing to dynamic pressure on a suction side of the first fan is set as a limiting rotational speed. The control unit prestores that limiting rotational speed and energizes the first motor such that the value of the target rotational speed is lower than that of that limiting rotational speed.

In this fan control system, when the rotational speed is increased, the situation where the second fan rotates in reverse owing to the dynamic pressure on the suction side of the first fan does not arise, which makes it easier to start up and accelerate the second fan.

A fan control system according to a sixth aspect of the present invention is a fan control system according to any one of the first through fourth aspects of the present invention, wherein when the rotational speed of the first fan is increased, the rotational speed when the second fan can no longer accelerate owing to dynamic pressure on the suction side of the first fan is set as the limiting rotational speed. The control unit prestores that limiting rotational speed and energizes the first motor such that the value of the target rotational speed is lower than that of that limiting rotational speed.

In this fan control system, when the rotational speed is increased, the situation where the second fan can no longer start up or accelerate owing to the dynamic pressure on the suction side of the first fan is suppressed.

A fan control system according to a seventh aspect of the present invention is a fan control system according to any one of the first through fourth aspects of the present invention, wherein when the rotational speed of the first fan is accelerated, the acceleration when the second fan starts to rotate in reverse owing to dynamic pressure on the suction side of the first fan is set as a limiting acceleration. The control unit prestores that limiting acceleration and, when the rotational speed of the first fan is increased, energizes the first motor such that the value of the acceleration is lower than that of that limiting acceleration.

In this fan control system, when the rotational speed is increased, the situation where the second fan rotates in reverse owing to any dynamic pressure on the suction side of the first fan does not arise, which makes it easy to start up the second fan.

A fan control system according to a eighth aspect of the present invention is a fan control system according to any one of the first through fourth aspects of the present invention, wherein when the rotational speed of the first fan is accelerated, the acceleration when the second fan can no longer accelerate owing to dynamic pressure on the suction side of the first fan is set as the limiting acceleration. The control unit prestores the limiting acceleration and, when that rotational speed of the first fan is increased, energizes the first motor such that the value of the acceleration is lower than that of that limiting acceleration.

In this fan control system, when the rotational speed is increased, the situation where the second fan can no longer start up or accelerate owing to the dynamic pressure on the suction side of the first fan is suppressed.

A fan control system according to a ninth aspect of the present invention is a fan control system according to any one of the first through eighth aspects of the present invention, wherein inverters control the rotational speeds of the first motor and the second motor.

In this fan control system, it is easy to change the rotational speed and the acceleration.

Advantageous Effects of Invention

In the fan control system according to the first aspect of the present invention, the rotational speeds of the fans are kept low, which reduces the dynamic pressure on the suction side of the fan that started early and suppresses pressure that would otherwise work to rotate adjacent fans in reverse. In addition, even if the adjacent fans were to rotate in reverse, the rotational speeds thereof would be low and the load that is needed to change the rotational direction from reverse rotation to forward rotation at start-up would be small.

In the fan control system according to the second aspect of the present invention, it is possible to provide a difference in the required rotational speeds of the first fan and the second fan and thereby to equalize the dynamic pressures on the suction sides of the first fan and the second fan. As a result, the generation of a load owing to a dynamic pressure differential is suppressed.

In the fan control system according to the third aspect of the present invention, it is possible to provide a difference in the target rotational speeds of the first fan and the second fan and thereby to equalize the dynamic pressures on the suction sides of the first fan and the second fan. As a result, the generation of a load owing to a dynamic pressure differential is suppressed.

In the fan control system according to the fourth aspect of the present invention, the rate of increase of the dynamic pressure on the suction side of each of the fans decreases and the load applied to the adjacent fan also decreases.

In the fan control system according to the fifth aspect of the present invention, when the rotational speed is increased, the situation where the second fan rotates in reverse owing to the dynamic pressure on the suction side of the first fan does not arise, which makes it easier to start up and accelerate the second fan.

In the fan control system according to the sixth aspect of the present invention, when the rotational speed is increased, the situation where the second fan can no longer start up or accelerate owing to the dynamic pressure on the suction side of the first fan is prevented.

In the fan control system according to the seventh aspect of the present invention, when the rotational speed is increased, the situation where the second fan rotates in reverse owing to any dynamic pressure on the suction side of the first fan does not arise, which makes it easy to start up and accelerate the second fan.

In the fan control system according to the eighth aspect of the present invention, when the rotational speed is increased, the situation where the second fan can no longer start up or accelerate owing to the dynamic pressure on the suction side of the first fan is prevented.

In the fan control system according to the ninth aspect of the present invention, it is easy to change the rotational speed and the acceleration.

DETAILED DESCRIPTION OF THE INVENTION

The embodiments of the present invention will now be explained, referencing the drawings. Furthermore, the embodiments below are merely illustrative examples of the present invention and do not limit its technical scope.

<Fan Control System>

Figure 1:
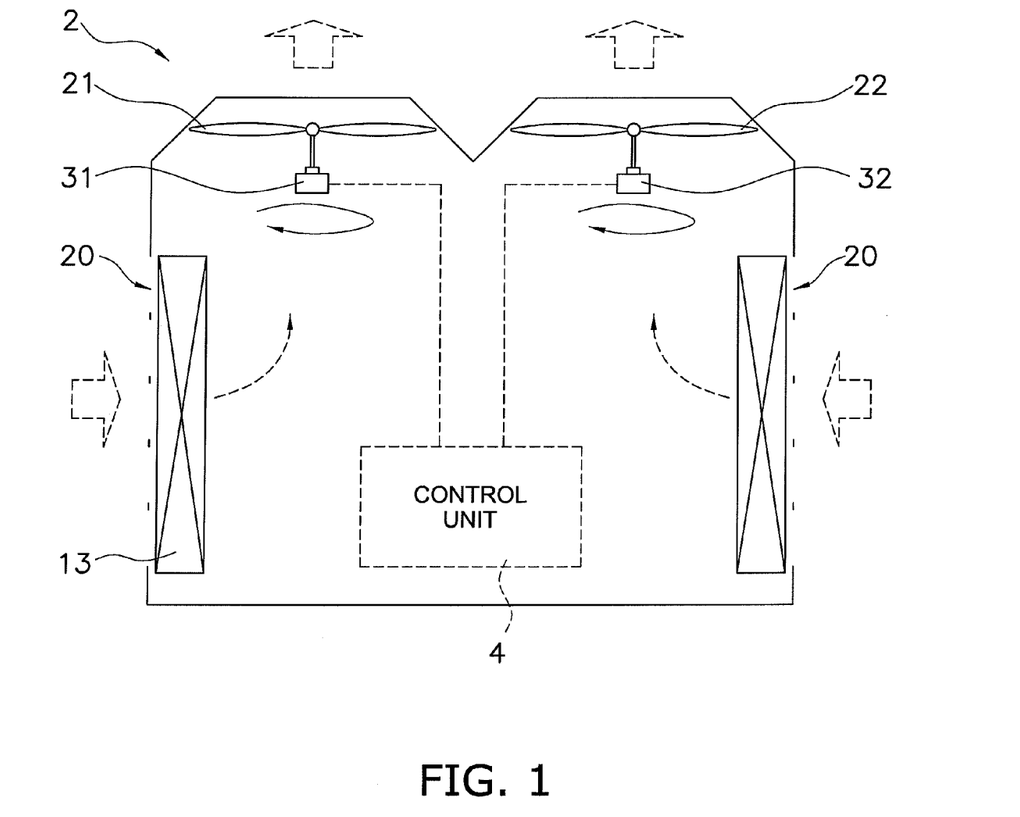
FIG. 1 is a configuration diagram of an air conditioner's outdoor unit that uses a fan control system according to an embodiment of the present invention.

FIG. 1 is a configuration diagram of an air conditioner's outdoor unit that uses a fan control system according to an embodiment of the present invention. In FIG. 1, a first fan 21 and a second fan 22, which are adjacent to one another, are disposed in an upper part of an air conditioner's outdoor unit 2. The first fan 21 is directly coupled to a rotary shaft of a first motor 31, and the second fan 22 is directly coupled to a rotary shaft of a second motor 32. The rotational speeds of the first motor 31 and the second motor 32 are controlled by inverters.

A control unit 4 is housed in a prescribed electrical equipment box of the air conditioner's outdoor unit 2 and controls the rotational speeds of the first motor 31 and the second motor 32. An outdoor heat exchanger 13 is disposed along sidewalls of the air conditioner's outdoor unit 2. Suction ports 20 are formed in the sidewalls of the air conditioner's outdoor unit 2; furthermore, by the rotation of the first fan 21 and the second fan 22, the air is sucked in via the suction ports 20, passes through the outdoor heat exchanger 13, reaches the first fan 21 and the second fan 22, and is blown out upward from the air conditioner's outdoor unit 2.

<Control Circuit>

Figure 2:
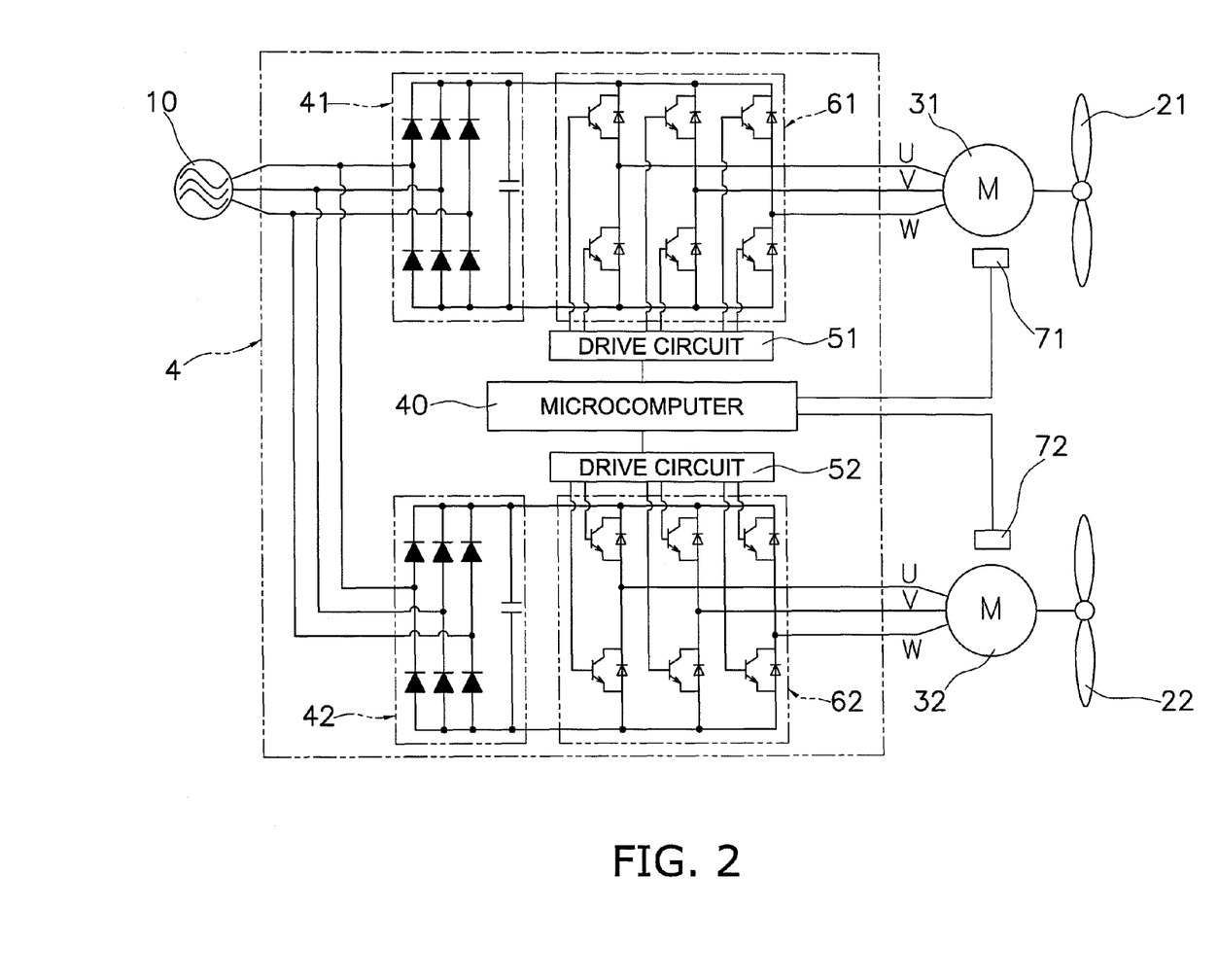
FIG. 2 is a circuit diagram of the same fan control system as FIG. 1.

FIG. 2 is a circuit diagram of the fan control system. In FIG. 2, the control unit 4 comprises two rectification circuits 41, 42, two drive circuits 51, 52, and two inverter circuits 61, 62, all of which are for controlling the rotational speeds of the first motor 31 and the second motor 32. The control unit 4 further comprises a microcomputer 40, which controls the two drive circuits 51, 52. A CPU and memory are built into the microcomputer 40. The first motor 31 and the second motor 32 are brushless DC motors; the first motor 31 comprises a stator, to which a voltage is supplied from the inverter circuit 61, and a rotor, which comprises a magnet that opposes that stator; furthermore, the second motor 32 comprises a stator, to which a voltage is supplied from the inverter circuit 62, and a rotor, which comprises a magnet that opposes that stator.

The rectification circuits 41, 42 are bridge circuits that each comprise six diodes and supply DC voltages they generate from the AC voltage supplied by a power supply 10 to the inverter circuits 61, 62. The inverter circuits 61, 62 are bridge circuits that each comprise six transistors and drive signals are input to the transistors from the drive circuits 51, 52.

A first rotational speed sensor 71 detects the rotational speed of the first motor 31, and a second rotational speed sensor 72 detects the rotational speed of the second motor 32. The first rotational speed sensor 71 detects the rotational speed of the rotor via a Hall element that is incorporated into the stator of the first motor 31. Likewise, the second rotational speed sensor 72 detects the rotational speed of the rotor via a Hall element that is incorporated into the stator of the second motor 32.

In the present embodiment, the rotational speeds of the first motor 31 and the second motor 32 substitute for the rotational speeds of the first fan 21 and the second fan 22. While monitoring the detection signals output from the first rotational speed sensor 71 and the second rotational speed sensor 72, the microcomputer 40 inputs the drive signals to the transistors of the inverter circuits 61, 62 such that the first fan 21 and the second fan 22 reach a prescribed rotational speed.

<Fan Startup Control>

In the air conditioner's outdoor unit of the present embodiment, wherein a plurality of fans are used in the same air passageway, when an attempt is made to start up a plurality of the fans simultaneously, it is possible that one of the fans may start up early owing to differences in, for example, the air resistances on the suction sides of the fans or the start-up characteristics of the fans themselves. If the dynamic pressure on the suction side of the fan that starts up early is large, then the loads at start-up on the fans at rest will increase. In the present embodiment, fan start-up control is performed to suppress any increase in the fans' loads at start-up. Fan start-up control will now be explained, referencing the drawings.

Figure 3:
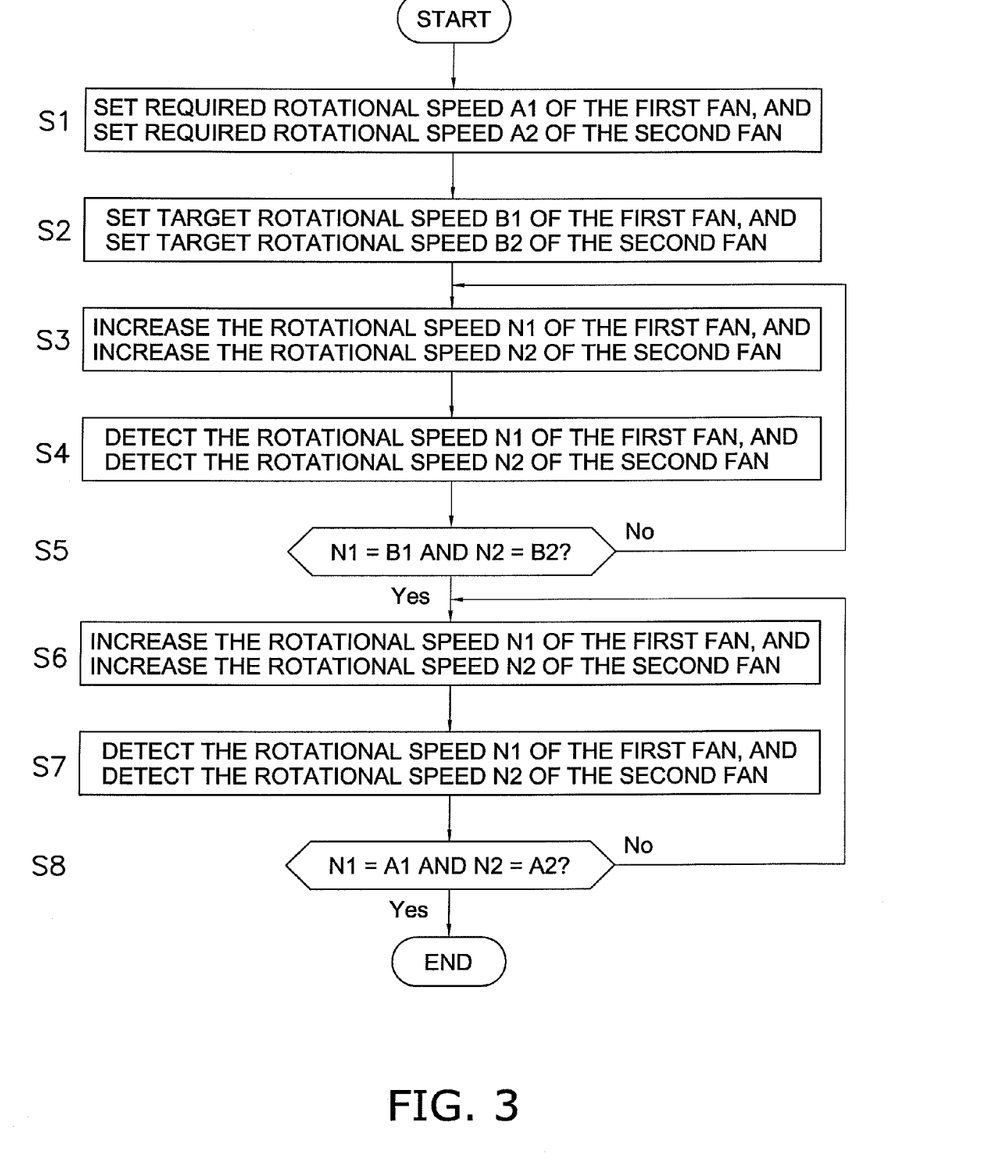
FIG. 3 is a flow chart of a fan start-up control method.

FIG. 3 is a flow chart of fan start-up control. In FIG. 3, when starting up the first fan 21 and the second fan 22, the microcomputer 40 sets required rotational speeds A1, A2 of the first fan 21 and the second fan 22 in step 51. The rotational speeds of the first fan 21 and the second fan 22 required in accordance with the operation state of the refrigeration cycle are stored in the memory of the microcomputer 40, and the microcomputer 40 sets this information by reading it in.

When the setting of the required rotational speeds A1, A2 is complete, the method proceeds to step S2, wherein target rotational speeds B1, B2 of the first fan 21 and the second fan 22 are set. The values of the target rotational speeds B1, B2 are lower than the values of the required rotational speeds A1, A2; furthermore, the target rotational speeds B1, B2 corresponding to the required rotational speeds A1, A2 of the first fan 21 and the second fan 22 are stored in memory, and the microcomputer 40 sets this information by reading it in.

When the setting of the target rotational speeds B1, B2 is complete, the method proceeds to step S3, wherein a rotational speed N1 of the first fan 21 and a rotational speed N2 of the second fan 22 are increased. In step S4, the rotational speeds of the first fan 21 and the second fan 22 are detected via the first rotational speed sensor 71 and the second rotational speed sensor 72, respectively.

In step S5, the method determines whether the rotational speed N1 of the first fan 21 has reached the target rotational speed B1 and whether the rotational speed N2 of the second fan 22 has reached the target rotational speed B2. If the determination in step S5 is YES, then the method proceeds to step S6; if the determination is NO, then the method returns to step S3.

In step S6, the rotational speed N1 of the first fan 21 and the rotational speed N2 of the second fan 22 are once again increased. In step S7, the rotational speeds of the first fan 21 and the second fan 22 are detected via the first rotational speed sensor 71 and the second rotational speed sensor 72, respectively.

In step S8, the method determines whether the rotational speed N1 of the first fan 21 has reached the required rotational speed A1 and whether the rotational speed N2 of the second fan 22 has reached the required rotational speed A2. If the determination in step S8 is YES, then the program terminates; if the determination is NO, the method returns to step S6.

As discussed above, when the rotational speeds of the first fan 21 and the second fan 22 are low, the microcomputer 40 waits until it is certain that the first fan 21 and the second fan 22 are rotating in a forward direction and then raises the rotational speeds to the required rotational speeds A1, A2; therefore, the situation wherein one of the fans rotates in a direction reverse that of the other fans does not arise. In the present embodiment, the air resistances on the suction sides, the start-up characteristics, and the like of the first fan 21 and the second fan 22 differ; therefore, the required rotational speed A1 of the first fan 21 and the required rotational speed A2 of the second fan 22 are set to different values, and the target rotational speed B1 of the first fan 21 and the target rotational speed B2 of the second fan 22 are also set to different values.

FIRST MODIFIED EXAMPLE

A plurality of target rotational speeds (e.g., first target rotational speeds C1, C2) may be provided for each of the fans, that is, the first fan 21 and the second fan 22, such that the numerical values of the second target rotational speeds B1, B2 are larger than those of the first target rotational speeds C1, C2. Raising the rotational speed in steps in turn raises the dynamic pressure on the suction side in steps, which reduces the impact on adjacent fans.

SECOND MODIFIED EXAMPLE (Start-Up Limiting Rotational Speed)

In a case wherein a plurality of fans exist within the same air passageway, when the rotational speed of one of the fans reaches the prescribed rotational speed, the adjacent fans sometimes rotate in reverse owing to the dynamic pressure on the suction side. Here, when a fan operates in the state wherein it is rotating in reverse, there is a risk that a protective function will trip owing to an overload, an overcurrent, and the like, causing the fan to stop operating; therefore, it is preferable that the fan does not rotate in reverse prior to start-up or during operation. In the second modified example, when the first fan 21 is started up in the state wherein both the first fan 21 and the second fan 22 are at rest and then its rotational speed is increased, the rotational speed when the second fan 22 starts to rotate in reverse owing to the dynamic pressure on the suction side of the first fan 21 is stored in the memory of the microcomputer 40 as a first start-up limiting rotational speed. When the microcomputer 40 increases the rotational speed of the first fan 21, the first motor 31 is energized such that the value of the target rotational speed B1 is lower than that of the first start-up limiting rotational speed.

Likewise, when the second fan 22 is started up in the state wherein both the first fan 21 and the second fan 22 are at rest and then its rotational speed is increased, the rotational speed when the first fan 21 starts to rotate in reverse owing to the dynamic pressure on the suction side of the second fan 22 is stored in the memory of the microcomputer 40 as a second start-up limiting rotational speed. When the microcomputer 40 increases the rotational speed of the second fan 22, the second motor 32 is energized such that the value of the target rotational speed B2 is lower than that of the second start-up limiting rotational speed.

(Limiting Rotational Speed)

In addition, when the rotational speed of the first fan 21 is increased in the state wherein both the first fan 21 and the second fan 22 are rotating, the rotational speed when the second fan 22 starts to rotate in reverse owing to the dynamic pressure on the suction side of the first fan 21 is stored in the memory of the microcomputer 40 as a first limiting rotational speed. When the microcomputer 40 increases the rotational speed of the first fan 21, the first motor 31 is energized such that the value of the target rotational speed B1 is lower than that of the first limiting rotational speed.

Likewise, when the rotational speed of the second fan 22 is increased in the state wherein both the first fan 21 and the second fan 22 are rotating, the rotational speed when the first fan 21 starts to rotate in reverse owing to the dynamic pressure on the suction side of the second fan 22 is stored in the memory of the microcomputer 40 as a second limiting rotational speed. When the microcomputer 40 increases the rotational speed of the second fan 22, the second motor 32 is energized such that the value of the target rotational speed B2 is lower than that of the second limiting rotational speed.

THIRD MODIFIED EXAMPLE (Startup Limiting Rotational Speed)

In a case wherein a plurality of fans exist within the same air passageway, when the rotational speed of one of the fans reaches the prescribed rotational speed, the protection function of the adjacent fans subject to dynamic pressure on the suction side may trip owing to an overload, an overcurrent, and the like, which makes those fans no longer able to start up or accelerate. To prevent such a situation, in the third modified example, when the first fan 21 is started up in the state wherein both the first fan 21 and the second fan 22 are at rest and then its rotational speed is increased, the rotational speed when the second fan 22 can no longer start up owing to the dynamic pressure on the suction side of the first fan 21 is stored in the memory of the microcomputer 40 as a first start-up limiting rotational speed. When the microcomputer 40 increases the rotational speed of the first fan 21, the first motor 31 is energized such that the value of the target rotational speed B1 is lower than that of the first start-up limiting rotational speed.

Likewise, when the rotational speed of the second fan 22 is increased in the state wherein both the first fan 21 and the second fan 22 are at rest, the rotational speed when the first fan 21 can no longer start up owing to the dynamic pressure on the suction side of the second fan 22 is stored in the memory of the microcomputer 40 as a second start-up limiting rotational speed. When the microcomputer 40 increases the rotational speed of the second fan 22, the second motor 32 is energized such that the value of the target rotational speed B2 is lower than that of the second start-up limiting rotational speed.

(Limiting Rotational Speed)

In addition, when the rotational speed of the first fan 21 is increased in the state wherein both the first fan 21 and the second fan 22 are rotating, the rotational speed when the second fan 22 can no longer accelerate owing to the dynamic pressure on the suction side of the first fan 21 is stored in the memory of the microcomputer 40 as a first limiting rotational speed. When the microcomputer 40 increases the rotational speed of the first fan 21, the first motor 31 is energized such that the value of the target rotational speed B1 is lower than that of the first limiting rotational speed.

Likewise, when the rotational speed of the second fan 22 is increased in the state wherein both the first fan 21 and the second fan 22 are rotating, the rotational speed when the first fan 21 can no longer accelerate owing to the dynamic pressure on the suction side of the second fan 22 is stored in the memory of the microcomputer 40 as a second limiting rotational speed. When the microcomputer 40 increases the rotational speed of the second fan 22, the second motor 32 is energized such that the value of the target rotational speed B2 is lower than that of the second limiting rotational speed.

FOURTH MODIFIED EXAMPLE (Start-Up Limiting Acceleration)

In a case wherein a plurality of fans exists within the same air passageway, when the acceleration of the rotational speed of one of the fans is high, it is possible that the dynamic pressure on the suction side will suddenly increase and induce reverse rotation in the adjacent fans. To prevent this situation, in the fourth modified example, when the first fan 21 is started up in the state wherein both the first fan 21 and the second fan 22 are at rest and then its rotational speed is accelerated, the acceleration when the second fan 22 starts to rotate in reverse owing to the dynamic pressure on the suction side of the first fan 21 is stored in the memory of the microcomputer 40 as a first start-up limiting acceleration. When the microcomputer 40 increases the rotational speed of the first fan 21, the first motor 31 is energized such that the first fan 21 accelerates at a rate lower than that of the first start-up limiting acceleration.

Likewise, when the second fan 22 is started up in the state wherein both the first fan 21 and the second fan 22 are at rest and its rotational speed is then accelerated, the acceleration when the first fan 21 starts to rotate in reverse owing to the dynamic pressure on the suction side of the second fan 22 is stored in the memory of the microcomputer 40 as a second start-up limiting acceleration. When the microcomputer 40 increases the rotational speed of the second fan 22, the second motor 32 is energized such that the second fan 22 accelerates at a rate lower than that of the second start-up limiting acceleration.

(Limiting Acceleration)

In addition, when the rotational speed of the first fan 21 is accelerated in the state wherein both the first fan 21 and the second fan 22 are rotating, the acceleration when the second fan 22 starts to rotate in reverse owing to the dynamic pressure on the suction side of the first fan 21 is stored in the memory of the microcomputer 40 as a first limiting acceleration. When the microcomputer 40 increases the rotational speed of the first fan 21, the first motor 31 is energized such that the first fan 21 accelerates at a rate lower than that of the first limiting acceleration.

Likewise, when the rotational speed of the second fan 22 is accelerated in the state wherein both the first fan 21 and the second fan 22 are rotating, the acceleration when the first fan 21 starts to rotate in reverse owing to the dynamic pressure on the suction side of the second fan 22 is stored in the memory of the microcomputer 40 as a second limiting acceleration. When the microcomputer 40 increases the rotational speed of the second fan 22, the second motor 32 is energized such that the second fan 22 accelerates at a rate lower than that of the second limiting acceleration.

FIFTH MODIFIED EXAMPLE (Start-Up Limiting Acceleration)

In a case wherein a plurality of fans exist within the same air passageway, when the acceleration of the rotational speed of one of the fans is high, it is possible that the dynamic pressure on the suction side will suddenly increase and cause a protection function of the adjacent fans to trip owing to an overload, an overcurrent, and the like, causing the fan to become no longer able to start up or accelerate. To prevent this situation, in the fifth modified example, when the first fan 21 is started up in the state wherein both the first fan 21 and the second fan 22 are at rest and then its rotational speed is accelerated, the acceleration when the second fan 22 can no longer start up owing to the dynamic pressure on the suction side of the first fan 21 is stored in the memory of the microcomputer 40 as a first start-up limiting acceleration. When the microcomputer 40 increases the rotational speed of the first fan 21, the first motor 31 is energized such that the first fan 21 accelerates at a rate lower than that of the first start-up limiting acceleration.

Likewise, when the second fan 22 is started up in the state wherein both the first fan 21 and the second fan 22 are at rest and its rotational speed is then accelerated, the acceleration when the first fan 21 can no longer start up owing to the dynamic pressure on the suction side of the second fan 22 is stored in the memory of the microcomputer 40 as a second start-up limiting acceleration. When the microcomputer 40 increases the rotational speed of the second fan 22, the second motor 32 is energized such that the second fan 22 accelerates at a rate lower than that of the second start-up limiting acceleration.

(Limiting Acceleration)

In addition, when the rotational speed of the first fan 21 is accelerated in the state wherein both the first fan 21 and the second fan 22 are rotating, the acceleration when the second fan 22 can no longer accelerate owing to the dynamic pressure on the suction side of the first fan 21 is stored in the memory of the microcomputer 40 as a first limiting acceleration. When the microcomputer 40 increases the rotational speed of the first fan 21, the first motor 31 is energized such that the first fan 21 accelerates at a rate lower than that of the first limiting acceleration.

Likewise, when the rotational speed of the second fan 22 is accelerated in the state wherein both the first fan 21 and the second fan 22 are rotating, the acceleration when the first fan 21 can no longer accelerate owing to the dynamic pressure on the suction side of the second fan 22 is stored in the memory of the microcomputer 40 as a second limiting acceleration. When the microcomputer 40 increases the rotational speed of the second fan 22, the second motor 32 is energized such that the second fan 22 accelerates at a rate lower than that of the second limiting acceleration.

<Features>

(1)

In this fan control system, when the first fan 21 and the second fan 22 are started up and their rotational speeds have reached the target rotational speeds B1, B2, the inverters control the first motor 31 and the second motor 32 such that the rotational speeds of the first fan 21 and the second fan 22 reach the required rotational speeds A1, A2.

As a result, the rotational speeds of the first fan 21 and the second fan 22 are kept low, which reduces the dynamic pressure on the suction side of the fan that started early and suppresses pressure that would otherwise work to rotate adjacent fans in reverse. In addition, even if the adjacent fans were to rotate in reverse, the rotational speeds thereof would be low and the load that is needed to change the rotational direction from reverse rotation to forward rotation at startup would be small.

Furthermore, the control unit 4 sets the required rotational speed A1 of the first fan 21 and the required rotational speed A2 of the second fan 22 to different values and sets the target rotational speed B1 of the first fan 21 and the target rotational speed B2 of the second fan 22 to different values, which equalizes the dynamic pressures on the suction sides of the first fan 21 and the second fan 22 and suppresses the generation of a load owing to a dynamic pressure differential.

Furthermore, the control unit 4 sets the target rotational speed in steps, which makes it possible to reduce the rate of increase when increasing the rotational speed to the higher target rotational speed and thereby to reduce the load applied to adjacent fans.

(2)

In this fan control system, when the rotational speed of the first fan 21 is increased in the state wherein both the first fan 21 and the second fan 22 are at rest, the rotational speed when the second fan 22 starts to rotate in reverse owing to the dynamic pressure on the suction side of the first fan 21 is set as the first start-up limiting rotational speed; furthermore, when the rotational speed of the second fan 22 is increased, the rotational speed when the first fan 21 starts to rotate in reverse owing to the dynamic pressure on the suction side of the second fan 22 is set as the second start-up limiting rotational speed.

The control unit 4 prestores the first start-up limiting rotational speed and the second start-up limiting rotational speed; furthermore, when the first fan 21 or the second fan 22 is started up and its rotational speed is increased, the first motor 31 or the second motor 32 can be energized such that the value of its target rotational speed is less than that of the relevant start-up limiting rotational speed (i.e., the first start-up limiting rotational speed or the second start-up limiting rotational speed). As a result, an increase in the load at start-up owing to the dynamic pressures on the suction sides of adjacent fans is suppressed.

In addition, when the first fan 21 is started up in the state wherein both the first fan 21 and the second fan 22 are rotating and then its rotational speed is increased, the rotational speed when the second fan 22 starts to rotate in reverse owing to the dynamic pressure on the suction side of the first fan 21 is set as the first limiting rotational speed; furthermore, when the rotational speed of the second fan 22 is increased, the rotational speed when the first fan 21 starts to rotate in reverse owing to the dynamic pressure on the suction side of the second fan 22 is set as the second limiting rotational speed.

The control unit 4 prestores the first limiting rotational speed and the second limiting rotational speed; furthermore, when the rotational speed of first fan 21 or the second fan 22 is increased, the first motor 31 or the second motor 32 can be energized such that the value of its target rotational speed is less than that of the relevant limiting rotational speed (i.e., the first limiting rotational speed or the second limiting rotational speed). As a result, an increase in the load owing to the dynamic pressures on the suction sides of adjacent fans is suppressed.

In addition, when the first fan 21 is started up in the state wherein both the first fan 21 and the second fan 22 are at rest and then its rotational speed is increased, the rotational speed when the second fan 22 can no longer start up owing to the dynamic pressure on the suction side of the first fan 21 may be set as the first start-up limiting rotational speed; furthermore, when the rotational speed of the second fan 22 is increased, the rotational speed when the first fan 21 can no longer start up owing to the dynamic pressure on the suction side of the second fan 22 may be set as the second start-up limiting rotational speed.

In addition, when the rotational speed of the first fan 21 is increased in the state wherein both the first fan 21 and the second fan 22 are rotating, the rotational speed when the second fan 22 can no longer accelerate owing to the dynamic pressure on the suction side of the first fan 21 may be set as the first limiting rotational speed; furthermore, when the rotational speed of the second fan 22 is increased, the rotational speed when the first fan 21 can no longer accelerate owing to the dynamic pressure on the suction side of the second fan 22 may be set as the second limiting rotational speed.

(3)

In this fan control system, when the first fan 21 is started up in the state wherein both the first fan 21 and the second fan 22 are at rest and its rotational speed is accelerated, the acceleration when the second fan 22 starts to rotate in reverse owing to the dynamic pressure on the suction side of the first fan 21 is set as the first start-up limiting acceleration; furthermore, when the second fan 22 is started up and its rotational speed is accelerated, the acceleration when the first fan 21 starts to rotate in reverse owing to the dynamic pressure on the suction side of the second fan 22 is set as the second start-up limiting acceleration.

The control unit 4 prestores the first start-up limiting acceleration and the second start-up limiting acceleration; furthermore, when the first fan 21 or the second fan 22 is started up and its rotational speed is accelerated, the first motor 31 or the second motor 32 can be energized such that the relevant fan accelerates at a rate that is less than that of the relevant start-up limiting acceleration (i.e., the first start-up limiting acceleration or the second start-up limiting acceleration). As a result, an increase in the load at startup owing to the dynamic pressures on the suction sides of adjacent fans is suppressed.

In addition, when the rotational speed of the first fan 21 is accelerated in the state wherein both the first fan 21 and the second fan 22 are rotating, the acceleration when the second fan 22 starts to rotate in reverse owing to the dynamic pressure on the suction side of the first fan 21 is set as the first limiting acceleration; furthermore, when the rotational speed of the second fan 22 is accelerated, the acceleration when the first fan 21 starts to rotate in reverse owing to the dynamic pressure on the suction side of the second fan 22 is set as the second limiting acceleration.

The control unit 4 prestores the first limiting acceleration and the second limiting acceleration; furthermore, when the rotational speeds of the first fan 21 or the second fan 22 is increased, the first motor 31 or the second motor 32 can be energized such that the relevant fan accelerates at a rate that is less than that of the relevant limiting acceleration (i.e., the first limiting acceleration or the second limiting acceleration). As a result, an increase in the load owing to the dynamic pressures on the suction sides of adjacent fans is suppressed.

In addition, when the first fan 21 is started up in the state wherein both the first fan 21 and the second fan 22 are at rest and then its rotational speed is increased, the acceleration when the second fan 22 can no longer start up owing to the dynamic pressure on the suction side of the first fan 21 may be set as the first start-up limiting acceleration; furthermore, when the rotational speed of the second fan 22 is increased, the acceleration when the first fan 21 can no longer start up owing to the dynamic pressure on the suction side of the second fan 22 may be set as the second startup limiting acceleration.

In addition, when the rotational speed of the first fan 21 is accelerated in the state wherein both the first fan 21 and the second fan 22 are rotating, the acceleration when the second fan 22 can no longer accelerate owing to the dynamic pressure on the suction side of the first fan 21 may be set as the first limiting acceleration; furthermore, when the rotational speed of the second fan 22 is accelerated, the acceleration when the first fan 21 can no longer accelerate owing to the dynamic pressure on the suction side of the second fan 22 may be set as the second limiting acceleration.

INDUSTRIAL APPLICABILITY

According to the present invention as described above, an increase in the load at startup on a plurality of adjacent fans is suppressed, which is useful in air conditioner's outdoor units, fan filter units, and the like wherein a plurality of fans start up simultaneously.

What is claimed is:

1. A fan control system, comprising:
a first fan;
a second fan adjacent to the first fan;
a first motor configured to rotate the first fan;
a second motor configured to rotate the second fan; and
a control unit configured to control rotational speeds of the first and second motors in order to control rotational speeds of the first and second fans, the control unit being further configured
to energize the first and second motors such that the rotational speeds of the first and second fans reach target rotational speeds prior to increasing the rotational speeds of the first and second fans to required rotational speeds, the target rotational speeds of the first and second fans being lower than the required rotational speeds of the first and second fans,
to energize the first and second motors such that the rotational speeds of the first and second fans reach the required rotational speeds after the rotational speeds of the first and second fans reach the target rotational speeds, such that when rotational speed of the first fan is increased, the rotational speed of the first fan when the second fan starts to rotate in reverse owing to dynamic pressure on a suction side of the first fan is set as a limiting rotational speed, and to prestore the limiting rotational speed and to energize the first motor such that the target rotational speed of the first motor is lower than the limiting rotational speed.

2. A fan control system according to claim 1, wherein the required rotational speeds of the first and second fans are different values.

3. A fan control system according to claim 1, wherein the target rotational speeds of the first and second fans are different values.

4. A fan control system, comprising:

a first fan;

a second fan adjacent to the first fan;

a first motor configured to rotate the first fan;

a second motor configured to rotate the second fan; and a control unit configured to control rotational speeds of the first and second motors in order to control rotational speeds of the first and second fans, the control unit being further configured to energize the first and second motors such that the rotational speeds of the first and second fans reach target rotational speeds prior to increasing the rotational speeds of the first and second fans to required rotational speeds, the target rotational speeds of the first and second fans being lower than the required rotational speeds of the first and second fans, to energize the first and second motors such that the rotational speeds of the first and second fans reach the required rotational speeds after the rotational speeds of the first and second fans reach the target rotational speeds, such that when rotational speed of the first fan is increased, the rotational speed of the first fan when the second fan no longer accelerates owing to dynamic pressure on a suction side of the first fan is set as a limiting rotational speed, and to prestore the limiting rotational speed and to energize the first motor such that the target rotational speed of the first motor is lower than the limiting rotational speed.

5. A fan control system according to claim 4, wherein the required rotational speeds of the first and second fans are different values.

6. A fan control system according to claim 4, wherein the target rotational speeds of the first and second fans are different values.

* * * * *